United States Patent [19]

Charvin

[11] Patent Number: 4,809,673
[45] Date of Patent: Mar. 7, 1989

[54] AUTONOMOUS DEVICES FOR HEATING FOOD CONTAINERS

[76] Inventor: Guy Charvin, Parc Saint Honoré-Chemin de la Peyrigoue, 06600 - Antibes, France

[21] Appl. No.: 129,515

[22] Filed: Dec. 7, 1987

[30] Foreign Application Priority Data

Dec. 5, 1986 [FR] France .................. 86 17163

[51] Int. Cl.$^4$ ................................ F24J 1/00
[52] U.S. Cl. .................... 126/263; 206/222; 426/109
[58] Field of Search ............. 126/263, 246; 426/109, 426/113, 114; 44/3.3; 206/222, 219

[56] References Cited

U.S. PATENT DOCUMENTS

| | | | |
|---|---|---|---|
| 3,213,932 | 10/1965 | Gottfurcht et al. | 126/263 X |
| 3,653,372 | 4/1972 | Douglas | 126/263 |
| 3,871,357 | 3/1975 | Grosso et al. | 126/263 |
| 3,874,557 | 4/1975 | Porter | 222/80 |
| 4,559,921 | 12/1985 | Benmussa | 126/263 |

FOREIGN PATENT DOCUMENTS

| | | |
|---|---|---|
| 0079286 | 12/1984 | European Pat. Off. . |
| 2348121 | 11/1977 | France . |
| 2574527 | 6/1986 | France . |
| 553692 | 7/1974 | Switzerland . |

Primary Examiner—Randall L. Green
Attorney, Agent, or Firm—Balogh, Osann, Kramer, Dvorak, Genova & Traub

[57] ABSTRACT

Device which has a disposable tray with an upper compartment which contains a food product and a lower compartment which has two reagents which are separated from each other by one or more watertight partitions and also having one axis with radial blades to tear said watertight partitions and a control knob visible outside of the tray and, moreover, having at least one screen equipped with orifices which are crosswise to said axis.

10 Claims, 5 Drawing Sheets

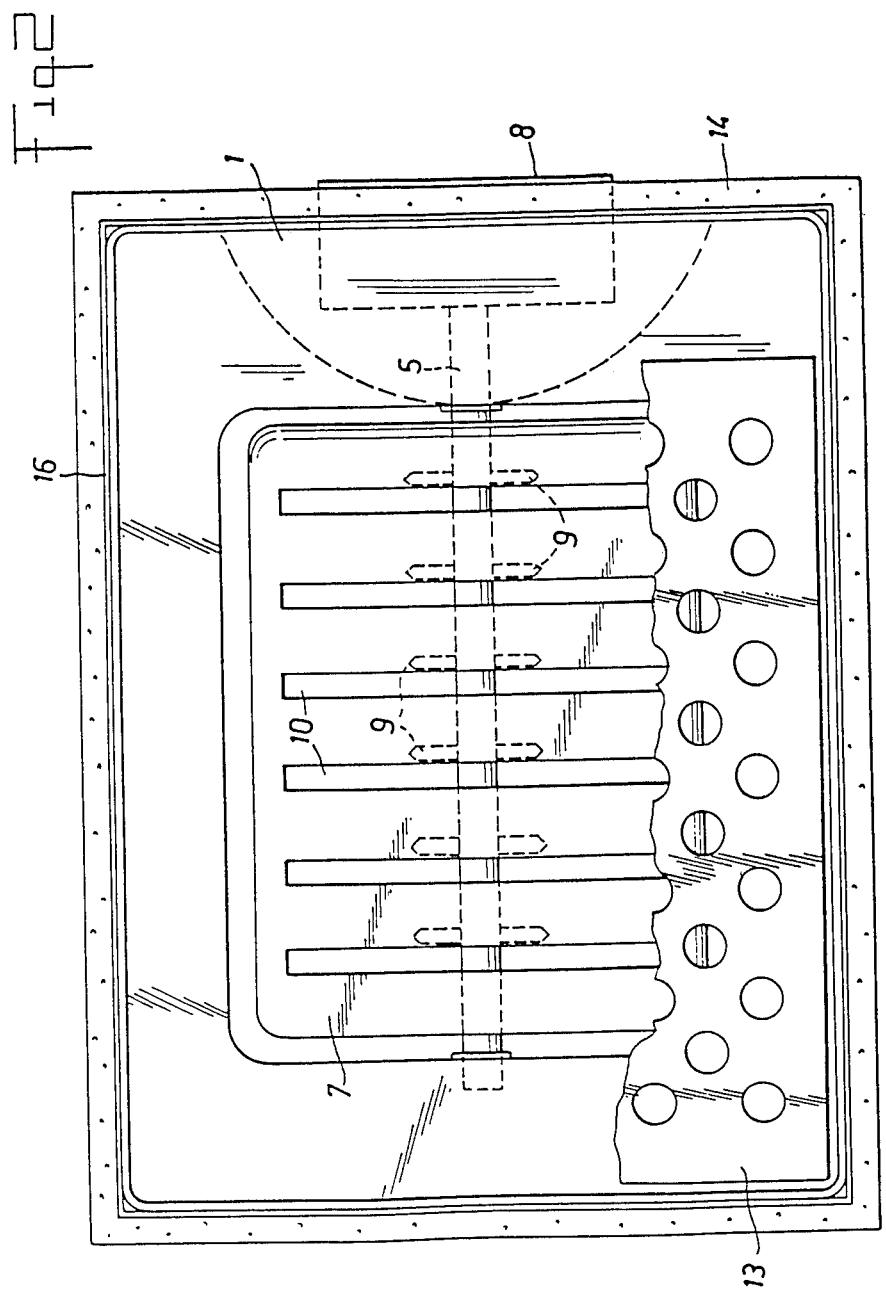

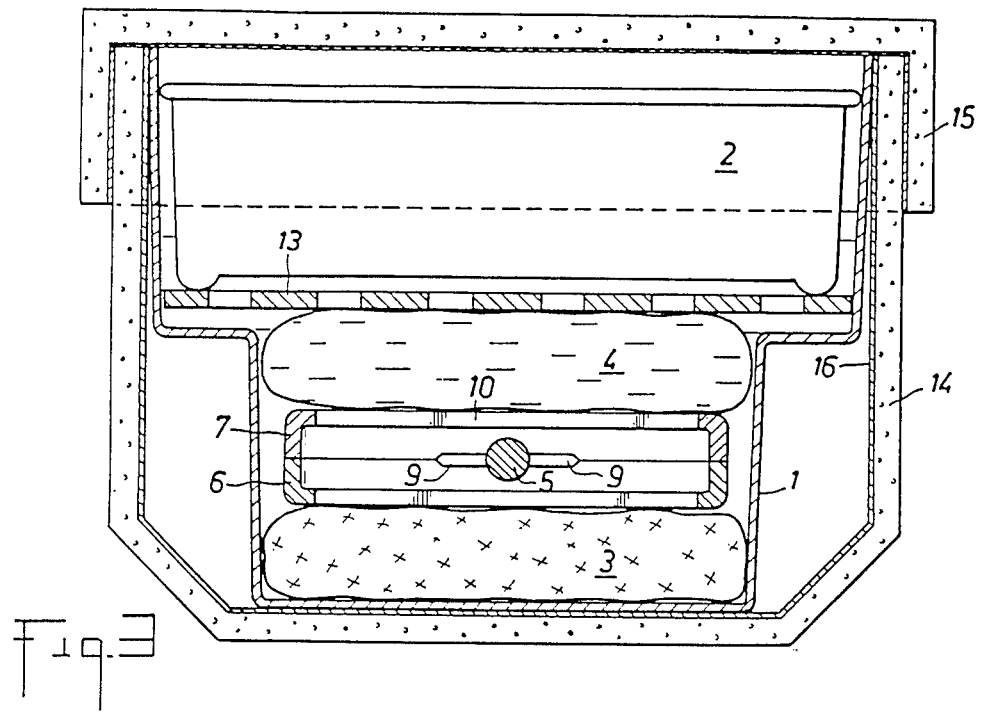
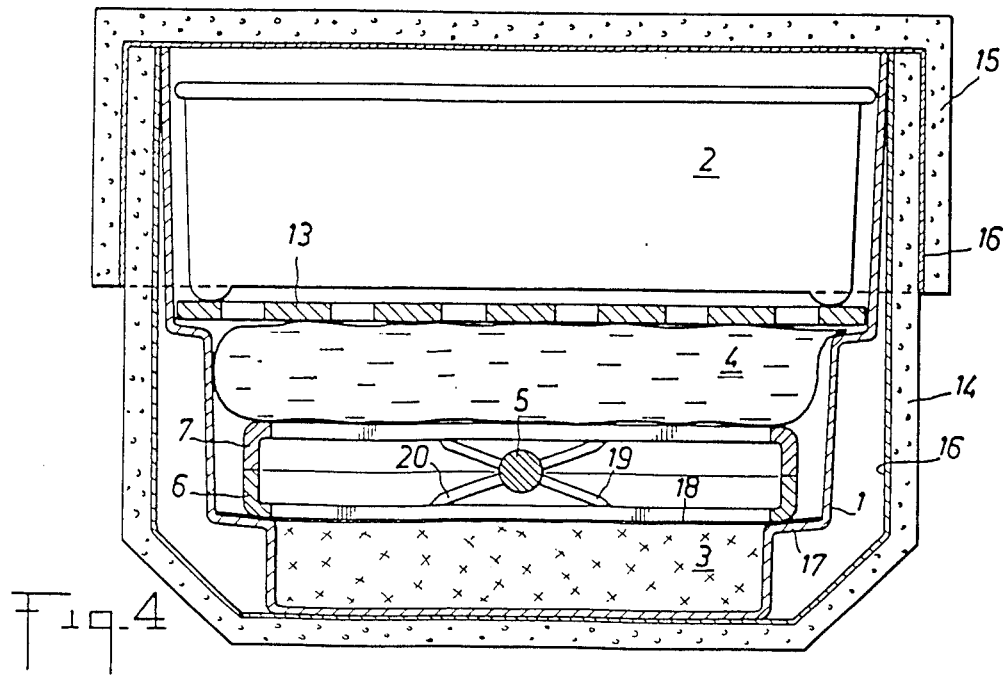

AUTONOMOUS DEVICES FOR HEATING FOOD CONTAINERS

The subject of this invention is autonomous devices for heating food containers.

The technical part of the invention is the manufacture of prepared meals and other canned foods.

There already are disposable devices that quickly heat sterilized plate or can type containers holding a prepared meal which do not have to use traditional means of heating, such as gas or electric stoves.

These exisiting devices have a disposable tray on the bottom of which there are two reagents which create an exothermic reaction once they make contact with each other.

The disposable tray can also hold a plate or can type container.

Before eating the food found in the container, the two reagents are made to come in contact and the food container's contents are quickly heated by the heat caused by the exothermic reaction.

The two reagents are, advantageously, quicklime and water, both very inexpensive reagents whose mixture releases enough heat without producing any harmful byproducts.

These existing devices make available to all who need to feed themselves where it is impossible to light a fire, the means to allow them to eat hot foods. They are especially intended for soldiers in the field or in maneuvers, campers, mountain climbers, hikers and possibly by those who must feed themselves at construction sites or outside their homes.

European Patent Publication No. A O 079 286 (S. BENMUSSA) describe devices of the existing type which have a disposable protective container, on the bottom of which there is a heating tray which has a plastic bag filled with water and enclosed in quicklime which is equipped with a tearing string to be pulled when one wishes to cause the exothermic reaction.

Publication FR. A. No. 2,348,121 describes a device of similar type.

U.S. Pat. No. 3,871,357 describes devices of similar type, which have a bag filled with water and a tear tab equipped with a cutting blade which serves to rip the water bag.

The devices of the invention are devices which have, as is already known, a disposable tray with an upper compartment that holds the food container to be heated and a lower compartment which contains the two reagents which create the exothermic reaction once they make contact, preferably powdery quicklime and water, reagents which are separated by one or more thin and watertight partitions, and the device has the means for tearing the partitions when one wishes to heat the food container.

The purposes of the invention are achieved by means of a device in which the means to tear the waterproof partitions are comprised of at least one axis with radial blades and equipped with a control knob that can be seen outside the tray, and they also have at least one screen which protects said blades and has orifices which are crosswise to the axis.

In accordance with a preferred realization method, the lower compartment has a first plastic bag filled with quicklime, which is placed in the bottom of said tray and has a second plastic bag filled with water which is placed over the quicklime bag and said screens, and said axis with the blades which are interspersed between the two bags.

In accordance with a preferred realization method, the blades are placed in the crosswise planes located in the orifices of the screens, in such a way that said blades catch on the screens if the control knob is turned, and said axis can slide lengthways bringing said blades to the crosswise orifices of said screens.

The control knob is advantageously attached to the tray by a safety device such as a shearing pin or a tearable seal. In accordance with a preferred realization method, the axis has blades which are moved at an angle, in such a way that it is possible to control the heating rate.

The invention results in new autonomous devices for heating cooked meals when they are to be eaten.

In accordance with the invention, the disposable devices which contain the quicklime and the water inside plastic bags, cost little to manufacture since the reagents are extremely economical and packing them watertight is an operation which can be performed inexpensively in mass production.

Moreover, the watertight bags prevent the quicklime from absorbing humidity and the water from coming in contact with the quicklime during stocking and transportation.

In accordance with the invention, the devices which have an axis equipped with blades permit a gradual release of calories and control of the heating rate, depending on the degree to which the control knob is turned, similarly to the control knobs of a gas burner or of an electric heating plate. In accordance with the invention, the devices have an axis with blades which are moved at an angle, enabling control of the heating rate.

The point where the screen(s) surround(s) the axis which has the blades provides good safety because the screens prevent the blades from accidentally cutting the watertight partitions.

The realization methods in which the axis should be shifted axially before making it turn, and in which the axis is equipped with a tearable safety pin, increase even more its safety of use.

The following description refers to the attached drawings which represent, without limitation, examples of realization of the devices in accordance with the invention.

FIG. 2 is a section, in accordance with II-II, of FIG. 1 with a partial tearing of the perforated plate and without the water bag.

FIG. 3 is a cross section of FIG. 1.

FIG. 4 is a cross section of a realization alternative.

Figure 1:
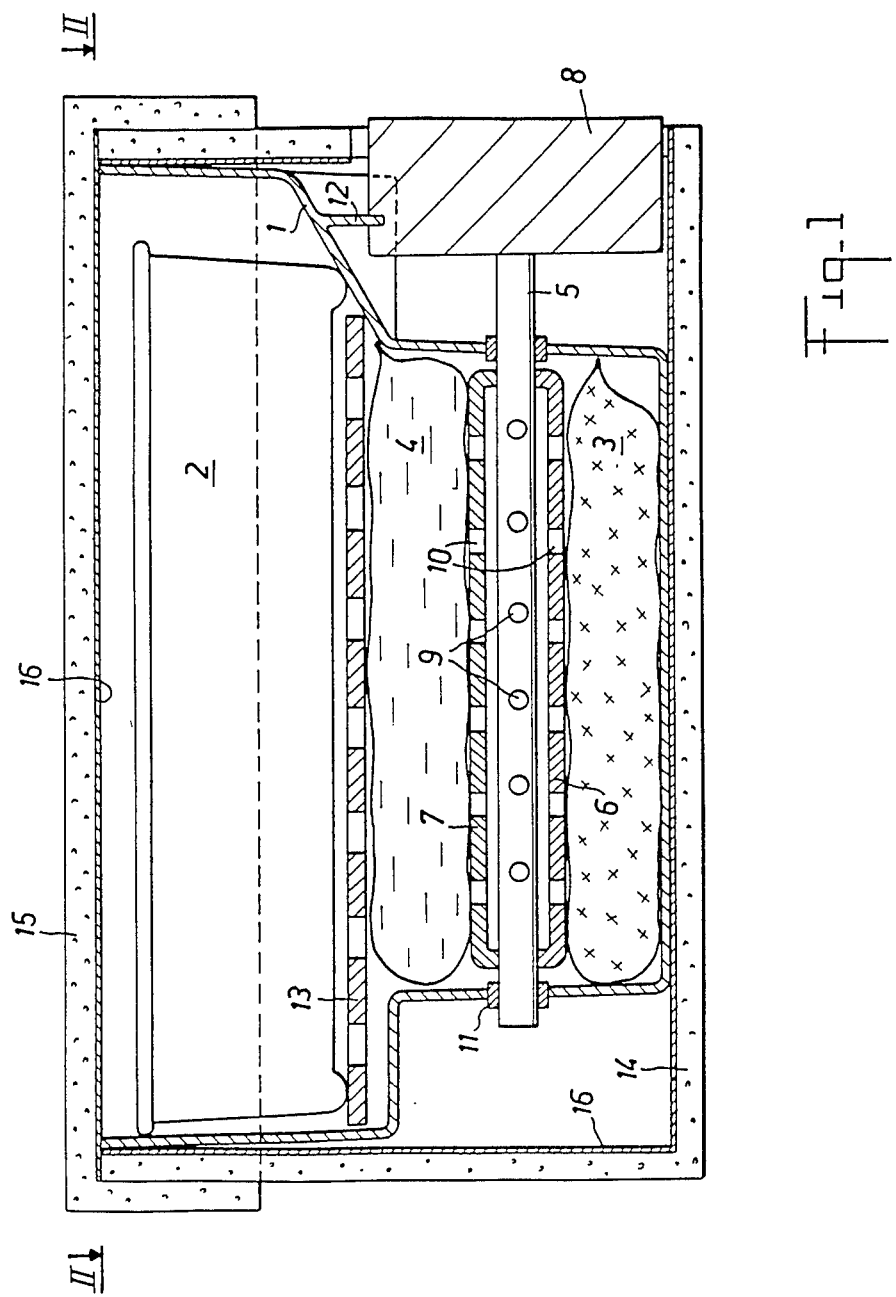
FIG. 1 is a lengthways section of a device in accordance with the invention.

FIGS. 1, 2 and 3 represent a preferred realization method for a device in accordance with the invention. This device has a tray, 1, which is disposable. Tray 1 has the advantage of being made of a plastic material, for example polyethilene or polypropylene, polyester of polyvynil chloride. Tray 1 serves to hold in its upper part food container 2, which, for example, may be a rectangular aluminum tray or a watertight can containing the food product, for example a sterilized prepared meal. Tray 1 has the shape of container 2, which it must hold and which may come in various shapes.

The purpose of the device, in accordance with the invention, is to allow heating the foods contained in container 2 right before they are to be eaten.

The device, in accordance with the invention, is advantageously designed to keep the food hot while it is eaten.

Tray 1 has a first plastic bag, 3, filled with quicklime and hermetically sealed. Bag 3 is placed at the bottom of tray 1. It holds an amount of quicklime which may range, for example, from 100 g to 250 g, depending on the size of container 2. Tray 1 has a second watertight plastic bag, 4, which holds the water, and the weight of the water may be, for example, in the order of 1.5 times the weight of the volume of the quicklime.

Tray 1 has a horizontal axis, 5, which is placed between screens 6 and 7, which are located between the two bags, 3 and 4.

Axis 5 has on one end a control knob, 8, for example a button or a handle which can be seen outside the tray and which allows control of axis 5 for turning and possibly axial translation.

FIG. 1 represents a realization method in which tray 1 has a hollow space, inside which button 8 is placed in such a way that it is protected by the tray.

Axis 5 has blades 9 which are, for example, sharp spindles radially placed on axis 5 and diametrically opposed.

Screens 6 and 7 have the advantage of consisting of two plastic plates curved along their lengthwise edges which are put against each other, as can be seen in FIG. 3, in such a way that the two plates form a frame inside which the axis, 5, and the blades, 9, are held when idle.

Screens 6 and 7 have crosswise orifices, 10, which extend perpendicularly to axis 5.

The number of orifices 10 is equal or higher than the number of blades 9.

FIGS. 1 to 3 represent a preferred realization method in which axis 5 is mounted on bearings 11, on which it can turn and also move axially.

FIGS. 1 to 3 represent the device when idle, that is, not during the heating period. Blades 9 are then situated in the horizontal plane of axis 5 and are shifted lengthwise in relation to orifices 10, in such a way that if button 8 is turned without having moved it axially, blades 9 catch on the screens, which constitutes a first safety by preventing bags 3 and 4 from being accidentally cut during handling. Moreover, button 8 is attached to tray 1 by a tearable pin, 12, and pressure must be applied to button 8 in order to tear pin 12 before the button can be moved, which constitutes a second safety.

Alternatively, just one safety may be used. The tearable pin, 12, may be omitted or one could design a non-movable, in-translation axis 5 and, if that be the case, blades 9 are sitauted facing orifices 10, and pin 12 averts axis rotation until it has been torn.

A device in accordance with the invention also has a punched partition, 13, for example a perforated plate or a screen, which is placed above water bag 4 and which divides tray 1 into two compartments, a lower compartment which contains bags 3 and 4 holding the heating reagents and the cutting mechanism for the bags, and an upper compartment which contains food container 2 which is to be heated.

The device which was just described has the advantage of being placed inside a thermal insulating container, 14, which has a lid, 15.

FIGS. 1 to 3 represent a realization method in which container 14 and lid 15 are made of a good thermal insulating cellular material which is inexpensive, for example expanded polystyrene or cellular polyurethane.

The internal walls of container 14 and of lid 15 have the advangtage of having a reflecting lining, 16, for example an aluminum-plastic sheet which reflects the thermal radiation emitted by tray 1.

FIG. 4 is a cross section of an alternative realization. The homologous parts are represented by the same marks on FIGS. 3 and 4.

In the alternative in accordance with FIG. 3, the powdery quicklime, 3, is placed at the bottom of tray 1.

The tray has a retaining wall, 17, on which a membrane, 18, is impermeably glued or soldered, to insulate the lower compartment containing the quicklime. Over membrane 18 are again the two screens 6 and 7, forming a frame inside which axis 5 turns with the blades.

Once axis 5 is made to turn, blades 9 cut membrane 18 and water bag 4, and the water gradually flows to the quicklime.

FIG. 4 shows an axis, 5, with blades 19 and 20 which are shifted angularly. This arrangement permits different heating rates. If control button 8 is turned clockwise one eighth of a turn, only blades 19 cut the watertight membrane 18 and water bag 4, in such a way that the number of cuts is reduced and the exothermic reaction is slower.

If control button 8 is turned one fourth of a turn, blades 20 also function and the reaction takes place more quickly.

Of course, the axis shown in FIG. 4 with the blades which are shifted angularly may be used on a device in accordance with FIG. 3 and, conversely, an axis in accordance with FIG. 3 may be used with a device in accordance with FIG. 4.

It can be seen that the mechanism with blades mounted on an axis with a control button that must be axially pushed and then turned more or less in order to regulate that heating rate, reproduces the type of control with buttons found in gas or electric burners, which makes for an easier use of the devices in accordance with the invention.

An important advantage of the devices in accordance with the invention is the fact that the blades mounted on an axis make, in the lower membrane 18 or in the bag containing the quicklime and in the water bag, slits which are diametrically opposed in relation to axis 5, as long as control button 8 makes less than one quarter turn. As a result, the water that flows from the water bag very gradually reaches the quicklime and so the heating rate can be regulated by turning the control button more or less. Thus one avoids an exothermic reaction that is too quick, which would lead to a high loss of calories and a bad distribution of temperature in the food contained in container 2, if it happens to be a poor thermic conductor, which is often the case.

Moreover, it is known that the organoleptic properties of food are often tied to the heating rate and the devices in accordance with the invention permit a gradual rise in temperature, which preserves the taste and the quality of the prepared meals.

The foregoing description relates to devices with only one axis, 5, equipped with blades. It is made clear that the invention extends to the case of devices with many axis equipped with blades, which would allow achieving even more possibilities of controlling the heating rate.

Figure 5:
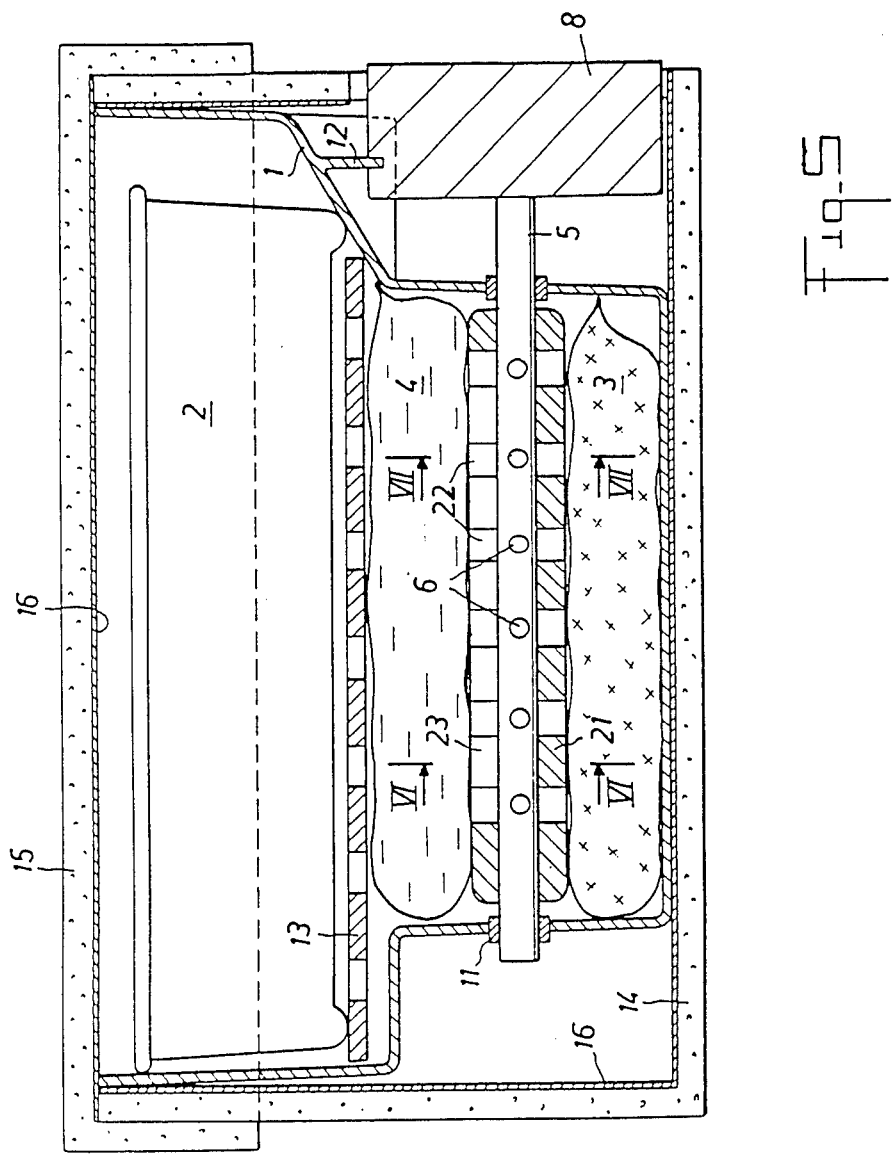
FIGS. 5, 6 and 7 represent one lengthways section and axial sections of a realization alternative with only one screen.

FIG. 5 represents an axial section of another realization method. The homologous parts are represented by the same marks on FIGS. 1 to 5.

In this example, the device has only one screen, 21, which is inserted between the two bags, 3 and 4, and which has the crosswise orifices, 22. Axis 5, which has radial blades 6, is placed in lengthwise notches 23 which form bearings. Blades 6 are located in the crosswise planes of orifices 22.

Figure 6:
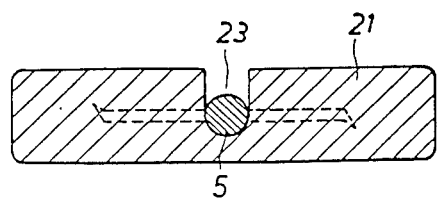

FIG. 6 is a cross section, in accordance with VI—VI, of the axis and the screen going through a bearing.

Figure 7:
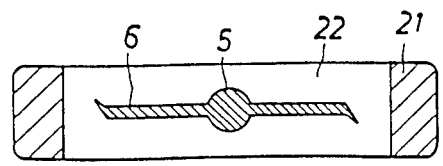

FIG. 7 is a cross section, in accordance with VII—VII, going through the axis of an orifice, 22.

When idle, blades 6 are situated in the width of the screen which protects them and prevents them from cutting the bags. Once button 8 is turned, blades 6 spin inside orifices 22 and go through the upper and lower partitions of the screens, cutting bags 3 and 4.

Figure 8:
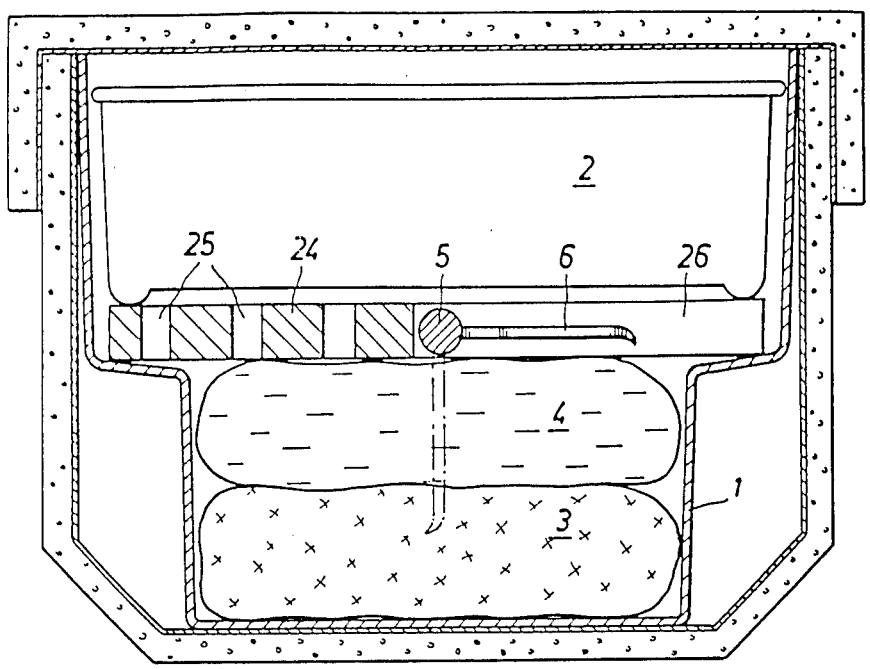
FIG. 8 represents a cross section of another realization alternative.

FIG. 8 represents a cross section of another realization method. The homologous parts are represented by the same marks on FIGS. 3, 4, and 8.

In this example, the device has one screen, 24, which is placed under the container to be heated, 2, and over water bag 4 which is placed on top of the quicklime bag, 3, located at the bottom of tray 1. Screen 24 has perforations, 25, for steam to pass through. Axis 5 has radial blades 6, extending on only one side. When idle, these blades are lodged in orifices 26 of screen 24, which extend on the same side as the blades. Blades 6 are long enough to reach and cut the top of the quicklime bag, 3, once button 8 is turned. The blades are shown as dotted in this position.

FIGS. 1 and 5 represent a button, 8, which is attached to tray 1 by a tearable pin, 12. It is made clear that this pin can be replaced by other equivalent safety devices, for example a tearable or removable seal.

What is claimed is:

1. Autonomous device to heat a food container of the type which has a disposable tray with an uppermost compartment which contains said food container and a lower compartment which has two reagents, preferably water and powdery quicklime, which are separated from each other by one or more watertight partitions, and having a means to tear said partitions, in which said means have at least one axis with radial blades, said axis equipped with a control knob which controls said axis and blades so as to cause tearing of the partitions by said blades, said knob being visible outside said tray and also having at least one screen surrounding said blades which prevents unintended blade movement, thereby preventing unintended tearing of the partitions, said screen having orifices which are crosswise to said axis and through which said blades can extend to cause tearing of the partitions.

2. Device in accordance with claim 1, having two screens which form a frame, inside which said axis and blades are located when idle.

3. Device in accordance with claim 1, in which said lower compartment contains a first plastic bag, filled with quicklime and placed at the bottom of said tray, and containing a second plastic bag filled with water and placed on top of the quicklime bag, said axis with blades being interposed between said bags.

4. Device in accordance with claim 1, in which when idle said blades are arranged in the crosswise planes located between the orifices of said screens, in such a way that the blades catch on the screens if the control knob is turned and said axis can slide lengthwise in order to bring the blades facing the crosswisse orifices of said screens.

5. Device in accordance with claim 1, in which said control knob is attached to said tray by a safety device such as a tearable pin or a removable seal.

6. Device in accordance with claim 1, in which said axis has blades which are shifted angularly, in such a way that it is possible to control the heating rate.

7. Device in accordance with claim 1, which has a perforated partition which separates the upper and lower compartments.

8. Device in accordance with claim, additionally having a container and a lid made of a thermic insulating material inside which said tray is placed.

9. Device in accordance with claim 8, in which the internal partitions of said container and lid have a reflecting lining.

10. Device in accordance with claim 1, in which the quicklime is placed at the bottom of said tray in a compartment that is insulated by a membrane that is either impermeably glued or soldered to a wall of said tray.

* * * * *